Sept. 4, 1934.   R. G. FEAR   1,972,555
KINETOGRAPHIC APPARATUS
Filed Aug. 25, 1930   2 Sheets-Sheet 1
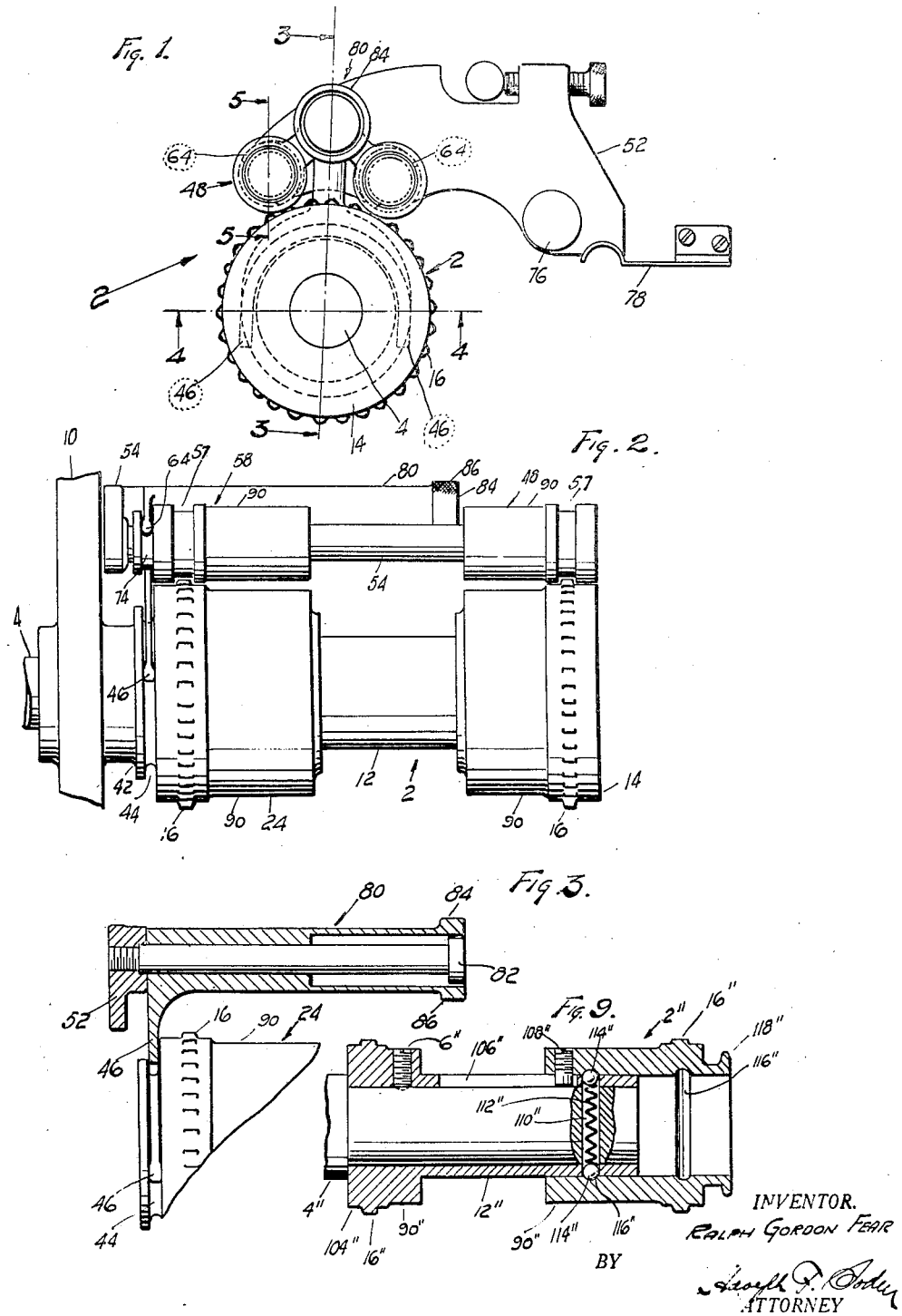

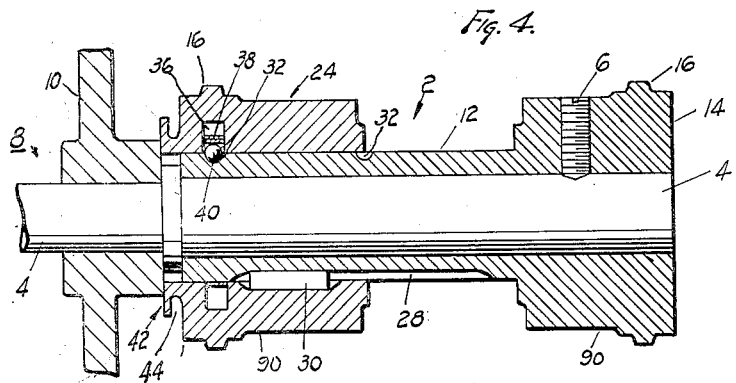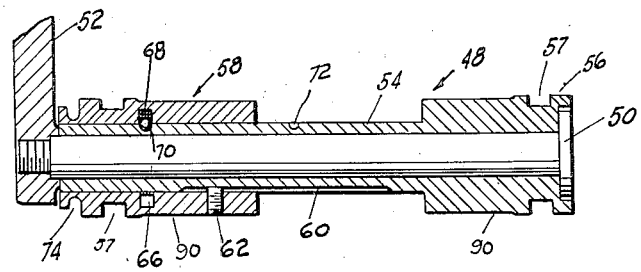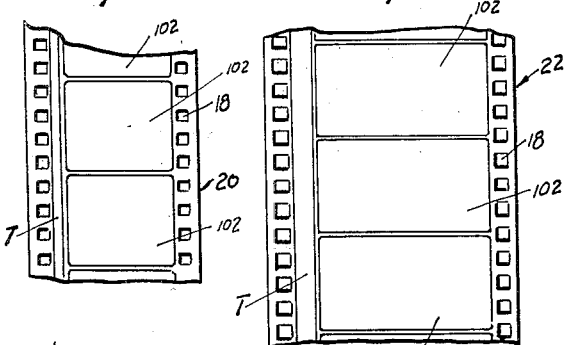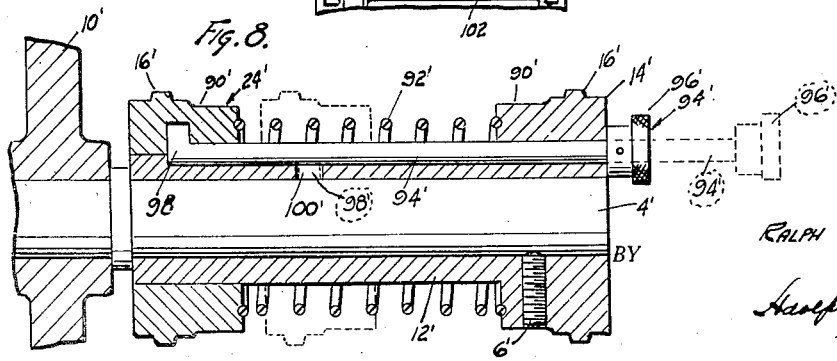

Patented Sept. 4, 1934

1,972,555

UNITED STATES PATENT OFFICE 1,972,555

KINETOGRAPHIC APPARATUS

Ralph Gordon Fear, Los Angeles, Calif.

Application August 25, 1930, Serial No. 477,611

6 Claims. (Cl. 271—2.3)

My invention relates to motion picture apparatus and more particularly to mechanisms of the apparatus such as cameras, projection machines, sound on film recording machines, sound on film reproducing machines, film viewing machines, film printing machines, waxing machines, and the like, and relative to such mechanisms wherein a film of varying width is fed through the mechanisms of said apparatus.

The machines as herein mentioned are equipped with mechanisms to handle standard size of film, of 35 mm., and due to the fact, that the motion picture producers are inclined to use a wider film or films, in making and producing motion pictures, therefore, it is an object of my invention to provide a film handling means of such construction, wherein a film other than standard type, may be effectively handled in the standard motion picture apparatus.

It is intended however, to confine this application to such type or types of films, also to such apparatus and mechanisms, wherein a wide or narrow film may be selectively fed thru said mechanism, and wherein said film or films have all of their characteristics the same, excepting the width, such as in 35 mm. and 50 mm. film.

It accordingly is an object of my invention to provide a novel form of adjustable sprocket means and holding-roller means, for handling said films thru said apparatus.

A further object of my invention is to provide means for adjusting said sprocket wheel and the rollers, wherein any preferred adjustment may be accomplished quickly, efficiently and with minimum loss of time.

Another object of my invention is to provide means for holding the adjustable sprocket wheel and the adjustable roller in any preferred position, corresponding to the width of the film fed thru said apparatus.

The above and further objects and advantages of my invention, as will hereinafter more fully appear, I attain by the construction described in the specification, and illustrated on the drawings forming a part of my application.

Reference is had to the accompanying drawings, in which similar reference characters denote similar parts.

In the drawings:

Fig. 1 is a front elevational view of my novel form of sprocket and a set of rollers mounted on a bracket, having an adjustable handle associated therewith.

Fig. 2 is a side elevational view of Fig. 1, shown by the arrow 2, in Fig. 1.

Fig. 3 is a cross-sectional view of the handle taken on the line 3—3 of the Fig. 1.

Fig. 4 is a cross-sectional view of the sprocket wheel taken on the line 4—4 of the Fig. 1.

Fig. 5 is a cross-sectional view of the roller taken on the line 5—5 of the Fig. 1.

Fig. 6 shows the 35 mm. film.

Fig. 7 shows the 50 mm. film.

Fig. 8 shows a cross-sectional view of the sprocket wheel in the modified form.

Fig. 9 is a cross-sectional view of the sprocket wheel, in another modified form.

Describing my invention more in detail, the sprocket 2, is mounted upon an operating shaft 4, in any conventional manner, preferably by means of a set screw 6; said shaft 4, being a protruding member of the driving mechanism 8, of the apparatus 10.

The sprocket 2, comprised of a drum 12, having a collar 14, integral with said drum 12, having sprocket teeth 16, circumferentially positioned thereon adapted to receive the perforations 18, of the film 20, or 22, and the adjustable sleeve 24, having circumferentially positioned teeth 16, to receive said perforations 18.

The drum 12, is provided with key-way 28, to receive a key 30, which is to guide said sleeve 24, lengthwise, to any preferred position, designated by the location of the concave depressions 32, upon the circumferential surface of said drum 12, and corresponding to the width of the film fed through the mechanism.

The adjustable sleeve 24, is slideably positioned upon the drum 12, having an internal recess 36, within which a preferably flat spring 38, is positioned to hold in place a locating ball 40, and the end 42, of said sleeve 24, has a circularly cut groove 44, to receive the fork ends 46, of the adjusting bar 80, operation of which will be presently described.

The roller 48, is freely rotatable upon a shaft 50, which is substantially mounted upon a bracket 52; said roller 48, comprises a drum structure 54, having a collar 56, integral with said drum structure 54, having groove 57, positioned as shown; and the adjustable roller 58 freely movable upon said drum structure 54, is equipped with key-way 60, and a pin 62, for guiding lengthwise said drum 58.

The drum 58, has a circumferentially surrounding groove 74, to receive the fork ends 64, of the adjusting bar 80, and an internally cut groove 66, wherein a spring 68, of preferably flat structure is positioned to hold in place a ball 70, in the locating concave depression 72.

The bracket 52, is preferably mounted upon a pin 76, and held in position by means of a spring 78, preferably as shown; said bracket 52, has an adjusting bar 80, positioned in close proximity to said roller 48, and said sprocket 2, which is slideably mounted upon a substantially positioned pin 82, preferably as shown in Fig. 3. Said adjusting bar 80 has fork ends 46, engaged in groove 44, of the sprocket 2, and a pair of fork ends 64, engaged in groove 74, of the roller 48.

The protruding end 84, of the bar 80, is provided with knurled surface as at 86, which is to enable an operator to handle said bar 80, with ease.

The sprocket 2, and the roller 48, are provided with circumferential centrally positioned relief 90, which is to prevent the center section of the film passing between said sprocket 2, and the roller 48, from making contact with said surface and injuring or otherwise spoiling said film surface.

In the Fig. 8, I have shown the construction of the sprocket wheel in modified form wherein the drum 12' with the collar 14', having sprocket teeth 16', is being positioned upon the drive shaft 4', by means of a set screw 6'; the adjustable sleeve 24', is slideably associated with said drum 12', having said sprocket teeth 16' associated therewith, to receive the perforations 18, of the film 20, or 22.

The sleeve 24' is kept in the farmost position by means of a spring 92, and is locked in position by means of a lock pin 94, having a knob 96, positioned at the end and a locking lug 98, internally positioned within said sleeve 24'.

The adjustment of said sleeve 24', to the preferred size, is accomplished by means of pulling the knob 96, (as shown in dotted lines in Fig. 8), and having the locking lug 98, placed in the slot 100, positioned in the drum 12'.

In the Figs. 6 and 7, I have shown the difference in 35 mm. and 50 mm. film, wherein the height of the picture 102, and the spacing between said perforations 18, and the position of the sound track "T", are the same, excepting the width as hereinbefore mentioned.

In the Fig. 9, I have shown another modification of said sprocket wheel 2", wherein the drum 12" is substantially mounted upon said driving shaft 4" by means of a set screw 6" and having a collar 104" and sprocket teeth 16" associated therewith; said drum 12" is equipped with a longitudinal groove 106" to receive a guide pin 108", substantially associated with the adjustable sprocket sleeve 24" which is slideably positioned upon said drum 12"—with a hole 110" housing therein a coil spring 112" and a set of locating balls 114", said sleeve 24" has a pair of internally cut grooves 116"—which correspond to the sizes or types of film used in said mechanism, and the outwardly positioned knurled ring 118" used for handling said sleeve 24" in making any preferred adjustments.

In operation:

The film passing over the sprocket 2, is held in place by means of rollers 48, mounted upon the bracket 52, and held against the circumferential surface of said sprocket 2 by means of the spring 78. When it is desired to change said mechanism from one size of film to the other, as may be required, the bar 80 is adjusted to correspond to the size of film intended to be fed thru said mechanism, wherein the sprocket 2 and the rollers 48, when so adjusted, will remain in said position and held in place by means of balls 40 and 70, pressed in the depressions 32 and 72 by the tension of the springs 38 and 68 of said sprocket and said rollers respectively.

It is also noted that the sound track "T" upon said film remains always in one position and by making said adjustments to accommodate a film to be used as hereinbefore mentioned, eliminates the otherwise necessary change of position of the sound recording and reproducing apparatus.

While I have described my invention with great particularity, it will be clear that the same may be modified throughout a wide range, and may be adaptable to any other film or films which may be fed thru said mechanism. I accordingly do not propose to be limited to the exact details of construction as shown and described, but reserve the right in practice to make any and all modifications that may fall within the scope of the appended claims.

I claim as my invention,

1. In a sprocket wheel of the class described comprising a drum, a collar integral with said drum having a plurality of sprocket teeth circumferentially positioned thereon, a key-way longitudinally positioned upon said drum, an adjustable sleeve slidably associated with said drum, a key internally positioned within said sleeve and slidably associated with said key-way, so that the said sleeve may be moved longitudinally over said drum, a recess internally positioned within said sleeve, yielding means positioned within said recess, a ball associated with said yielding means and concave depression positioned upon the surface of said drum adapted to receive said ball, so that the said adjustable sleeve moving longitudinally may be held in position upon said drum of said sprocket wheel.

2. In the devices of the class described, adapted for handling films of varied widths in a motion picture apparatus, comprising in combination, a drive shaft associated with said apparatus, a sprocket wheel connected to said drive shaft comprising, a drum and a collar integral with said drum having a plurality of sprocket teeth circumferentially positioned thereon, an adjustable sleeve slidably associated with the said drum having a plurality of sprocket teeth circumferentially positioned thereon, corresponding in size and in number to the said teeth upon said collar of said drum, a bracket pivotally connected to said apparatus, a plurality of shafts connected to said bracket, a plurality of rollers rotatably positioned upon said shafts, comprising a drum and a collar integral with said drum, a circumferential groove positioned upon said collar, a plurality of adjustable sleeves slidably positioned upon said drum of said rollers, and means associated with said sprocket wheel and said rollers, to adjust and hold the said sprocket and said rollers in position, corresponding to the width of the film which may be fed through said device.

3. In a kinetographic apparatus, a bifurcated sprocket wheel, having two sets of sprocket teeth, mounted upon a rotatable driving shaft, one set of said sprocket teeth being mounted in a fixed position upon said driving shaft and the other set of said sprocket teeth being slidably adjustable upon said shaft, film engaging rollers mounted upon a roller shaft and associated with said sprocket teeth, means for adjusting the space between said rollers, and means for retaining said rollers upon said roller shaft.

4. In a kinetographic apparatus, a bifurcated sprocket wheel, having two sets of sprocket teeth, mounted upon a rotatable driving shaft, one set of said sprocket teeth being mounted in a fixed position upon said driving shaft and the other set of said sprocket teeth being slidably adjustable upon said shaft, film engaging rollers mounted upon a roller shaft and associated with said sprocket teeth, means for adjusting the space between said rollers, means for retaining said rollers upon said roller shaft, and means for selectively holding said rollers in various positions upon said shaft.

5. In a kinetographic apparatus, a bifurcated sprocket wheel, having two sets of sprocket teeth, mounted upon a rotatable driving shaft, one set of said sprocket teeth being mounted in a fixed position upon said driving shaft and the other set of said sprocket teeth being slidably adjustable upon said shaft, film engaging rollers mounted upon a roller shaft and associated with said sprocket teeth, means for adjusting the space between said rollers, means for retaining said rollers upon said roller shaft, means for selectively holding said rollers in various film engaging positions with respect to said sprocket teeth and an adjustable film engaging or disengaging mounting for said film engaging rollers and roller shafts.

6. In a kinetographic apparatus of the class described, the combination of, a bifurcated sprocket wheel, having two sets of sprocket teeth, mounted upon a rotatable driving shaft, one set of said sprocket teeth being in fixed position upon and an integral part of a sprocket drum which is mounted upon said driving shaft and the other set of said sprocket teeth being slidably adjustable upon said sprocket drum, a film engaging roller, having two sets of sprocket engaging collars, mounted upon a roller shaft, one set of said sprocket engaging collars being in fixed position upon and an integral part of a roller drum which is mounted upon said roller shaft and the other set of said sprocket engaging collars being slidably adjustable upon said roller drum, and means connected to said adjustable sprocket teeth and the said adjustable sprocket engaging collars for adjusting the space between the said sprocket teeth wheels and the said film engaging rollers.

RALPH GORDON FEAR.